US006872919B2

(12) United States Patent
Wakefield et al.

(10) Patent No.: US 6,872,919 B2
(45) Date of Patent: Mar. 29, 2005

(54) MULTI-STAGE CATALYST FOR A COOKING APPLIANCE

(75) Inventors: John H. Wakefield, Pensacola, FL (US); John Scott Brown, Charleston, TN (US); Robert Z. Whipple, Jr., Loudon, TN (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/365,635

(22) Filed: Feb. 13, 2003

(65) Prior Publication Data

US 2003/0116555 A1 Jun. 26, 2003

Related U.S. Application Data

(63) Continuation-in-part of application No. 10/251,784, filed on Sep. 23, 2002, now Pat. No. 6,723,961, which is a continuation-in-part of application No. 10/058,323, filed on Jan. 30, 2002, now Pat. No. 6,472,640, which is a continuation-in-part of application No. 09/902,655, filed on Jul. 12, 2001, now Pat. No. 6,566,638, which is a continuation of application No. 09/650,417, filed on Aug. 29, 2000, now Pat. No. 6,291,808.

(51) Int. Cl.[7] .............................. A21B 1/00; A01J 15/14
(52) U.S. Cl. .......................................... 219/400; 99/467
(58) Field of Search ................................. 219/400, 391, 219/393, 392, 394, 395, 396, 397, 398, 399; 99/467; 120/19–22

(56) References Cited

U.S. PATENT DOCUMENTS

| | | | | |
|---|---|---|---|---|
| 3,166,895 A | | 1/1965 | Slayter et al. | |
| 3,327,094 A | | 6/1967 | Martin et al. | |
| 3,428,434 A | | 2/1969 | Hurko | |
| 3,428,435 A | | 2/1969 | Hurko et al. | |
| 3,549,859 A | | 12/1970 | Faehling et al. | |
| 3,553,425 A | | 1/1971 | Fry | |
| 3,556,077 A | | 1/1971 | Tilus | |
| 3,656,469 A | | 4/1972 | Jung et al. | |
| 3,669,090 A | | 6/1972 | Jung et al. | |
| 3,785,778 A | | 1/1974 | Burstein et al. | |
| 3,962,561 A | | 6/1976 | Maitenaz | |
| 4,039,292 A | | 8/1977 | Morini et al. | |
| 4,054,418 A | | 10/1977 | Miller et al. | |
| 4,138,220 A | | 2/1979 | Davies et al. | |
| 4,374,754 A | | 2/1983 | Arai | |
| 4,392,038 A | | 7/1983 | Day et al. | |
| 4,483,940 A | * | 11/1984 | Ono et al. | 502/159 |
| 4,493,976 A | | 1/1985 | Wilson | |
| 4,494,525 A | | 1/1985 | Albertsen | |
| 4,547,642 A | | 10/1985 | Smith | |
| 4,831,237 A | | 5/1989 | Gelineau | |
| 4,926,837 A | | 5/1990 | Parker et al. | |
| 4,954,694 A | | 9/1990 | Nagai et al. | |
| 5,094,222 A | | 3/1992 | Fukuda et al. | |
| 5,163,869 A | | 11/1992 | Yeh et al. | |
| 5,464,006 A | * | 11/1995 | Ledjeff et al. | 122/14.1 |
| 5,534,678 A | | 7/1996 | Bowles et al. | |
| 5,622,100 A | * | 4/1997 | King et al. | 99/386 |

(Continued)

*Primary Examiner*—Daniel Robinson
(74) *Attorney, Agent, or Firm*—Diederiks & Whitelaw, PLC

(57) ABSTRACT

A convection cooking appliance includes an oven cavity in communication with an air channel assembly incorporating a catalyst. The catalyst includes multiple stages defined by first and second, spaced honeycomb structures. The first honeycomb structure is arranged to initially vaporize the carbon cooking byproducts which then directed to the second honeycomb structure wherein the vaporized byproducts are broken down into carbon dioxide and water prior to being expelled from the catalyst. Between the first and second honeycomb structures is a gap which functions to create a turbulence for the delivery of the vapor to the second honeycomb structure.

27 Claims, 6 Drawing Sheets

U.S. PATENT DOCUMENTS

| | | | | | |
|---|---|---|---|---|---|
| 5,693,298 | A | | 12/1997 | Bar-Ilan | |
| 5,753,339 | A | | 5/1998 | Hawes | |
| 5,826,520 | A | * | 10/1998 | Mainord | 110/342 |
| 5,927,265 | A | | 7/1999 | McKee et al. | |
| 6,051,199 | A | | 4/2000 | Teller | |
| 6,235,254 | B1 | * | 5/2001 | Murphy et al. | 423/212 |
| 6,291,808 | B1 | * | 9/2001 | Brown | 219/681 |
| 6,314,870 | B1 | * | 11/2001 | Staller et al. | 99/400 |
| 6,427,640 | B1 | * | 8/2002 | Hickey et al. | 123/41.31 |
| 6,566,638 | B2 | * | 5/2003 | Brown | 219/681 |
| 6,616,909 | B1 | * | 9/2003 | Tonkovich et al. | 423/648.1 |

* cited by examiner

MULTI-STAGE CATALYST FOR A COOKING APPLIANCE

The present application represents a continuation-in-part of U.S. patent application Ser. No. 10/251,784 filed Sep. 23, 2002 now U.S. Pat. No. 6,723,961, which is a continuation-in-part of U.S. patent application Ser. No. 10/058,323 filed Jan. 30, 2002, now U.S. Pat. No. 6,472,640, which is a continuation-in-part of U.S. patent application Ser. No. 09/902,655, filed Jul. 12, 2001 now U.S. Pat. No. 6,566,638, which is a continuation of U.S. patent application Ser. No. 09/650,417 filed Aug. 29, 2000, now U.S. Pat. No. 6,291, 808.

BACKGROUND OF THE INVENTION

1. Field of the Invention

The present invention pertains to the art of cooking appliances and, more particularly, to a multi-stage catalyst for a cooking appliance.

2. Discussion of the Prior Art

In the art of cooking appliances, it has been heretofore proposed to enable an appliance to operate in a self-cleaning mode. For example, in a conventional range having a cooking cavity which can be heated by one or more cooking elements arranged within the cooking cavity to perform at least baking and broiling functions, it is known to operate one or more of the cooking elements to perform a pyrolytic self-cleaning operation in order to cleanse the walls of the cavity from grease and other food soils developed during normal cooking operations. In such a cooking arrangement, the cooking elements used to perform the cleaning process are located entirely within the cooking cavity.

In addition, it is known to provide a catalytic self-cleaning oven. In such an arrangement, the walls of the oven are coated with a catalytic material which provides for self-cleaning of the oven cavity during cooking operations. In performing any self-cleaning function, byproducts, including smoke, gases and other odorous fumes, are inherently produced. A typical oven cavity will be vented to permit the escape of these byproducts to the ambient surroundings. In some cases, a catalytic oxidation unit is provided in the vent to react with the flowing byproducts.

In still other cooking appliance arrangements, a combination of pyrolytic and catalytic cleaning is performed. Regardless of the fact that various self-cleaning systems have been proposed in the art, there still exists a need for an improved self-cleaning system for a cooking appliance which maximizes the elimination of byproducts, while also minimizing the necessary operating time for any self-cleaning mode. Particular concerns are raised in connection with the necessary operating time and byproduct elimination in a self-cleaning convection oven which essentially relies on a heated flow of recirculating air for raising the temperature in an oven cavity. In particular, there exists a particular need for an improved catalyst used to heat and vaporize grease and oil, while starting the molecular breakdown of carbon chains in various stages for cleaning purposes.

SUMMARY OF THE INVENTION

The present invention is directed to a catalyst used to heat and vaporize grease and oil for cleaning of a convection cooking appliance, particularly an appliance including an air channel assembly which is defined by ducting extending about portions of the oven cavity for directing a recirculating flow of air into and out of the oven cavity. The overall system utilizes various heating elements to enhance the heating of the oven cavity, as well as the catalyst in order to enhance the efficient elimination of developed smoke, odor and other byproducts, and to effectively reduce the necessary cleaning cycle time for the appliance.

The convection cooking appliance preferably includes first, second and third heating units which are individually controlled, along with a blower unit, in performing a self-cleaning function for the appliance. The first and third heating units are disposed in the air channel assembly, while the second heating unit is positioned in the oven cavity. A controller is provided for regulating the activation and deactivation state of the various components in a manner which preheats the oven cavity in a relatively short time period, while assuring that initially developed smoke, gases and other odorous fumes inherently produced as byproducts of a self-cleaning operation are effectively eliminated.

During the preheat phase of the cleaning mode, the controller initially activates the blower element in combination with each of the first and third heating units in the air channel assembly, with the developed flow of air through the oven cavity being directed to the catalyst for elimination of the byproducts. Following the preheat phase, at least the blower and the third heating element are deactivated and the second heating unit is activated to rapidly heat the oven cavity through a radiant heating operation. A temperature sensor is linked to the controller to efficiently determine the optimum time to switch between the various heating sources for the oven cavity during the overall self-cleaning operation.

In accordance with a preferred self-cleaning method, an initial, catalyst pre-heat stage, established mainly for smoke elimination purposes, is followed by a moderately high-temperature presoak stage to burn off various light molecular weight hydrocarbons and the like. For the main cleaning operation, a high temperature stage is initiated in combination with a high convection air flow to establish high oven surface temperatures in a minimal time frame. This timed stage is followed by a cool down period wherein both the temperature and the convection speed are reduced. Thereafter, providing an intermediate temperature heating stage with medium convective air flow, followed by a cooling stage, is provided for preset time periods. This combination of intermediate temperature heating and subsequent cooling stages is repeated until the total self-cleaning time is completed.

In accordance with the present invention, the convection cooking appliance particularly employs a multi-stage catalyst. Specifically, the catalyst is designed to heat and vaporize the grease and oils that are produced from cooking food, with a first stage essentially constituting a heating and vaporizing phase and a second or final stage operating to break down carbon chains. The first stage constitutes a honeycomb structure of metal and ceramic that is heated to an elevated temperature which prevents overloading of the second stage. The micro-particulate grease and oils collect in various surfaces of the honeycomb and are vaporized. The vaporized grease and oils are then blown off the honeycomb structure onto a filter assembly which is part of the overall catalyst.

A narrow gap or opening is formed between the first stage and the final stage. The gap is designed to create a turbulence in order to distribute the vapor molecules to the final stage of the catalyst. The final stage of the catalyst preferably comprises a metallic or ceramic honeycomb structure wherein the holes in the honeycomb are smaller than in the first stage. This arrangement generates a larger surface area in the final stage catalyst as compared to the first stage. One or more portions of the catalyst can be treated with catalyst materials, such as platinum, to convert the hot vaporized byproducts into carbon dioxide and water. As the cooking appliance preferably incorporates a microwave energy source, the catalyst is covered with expanded metal or a perforated sheet to block any microwave energy that may be used in connection with the oven cavity.

Additional objects, features and advantages of the present invention will become more fully apparent below with reference to a preferred embodiment of the invention, when taken in conjunction with the drawings wherein like reference numerals refer to corresponding parts in the several views.

DETAILED DESCRIPTION OF THE PREFERRED EMBODIMENTS

Figure 1:
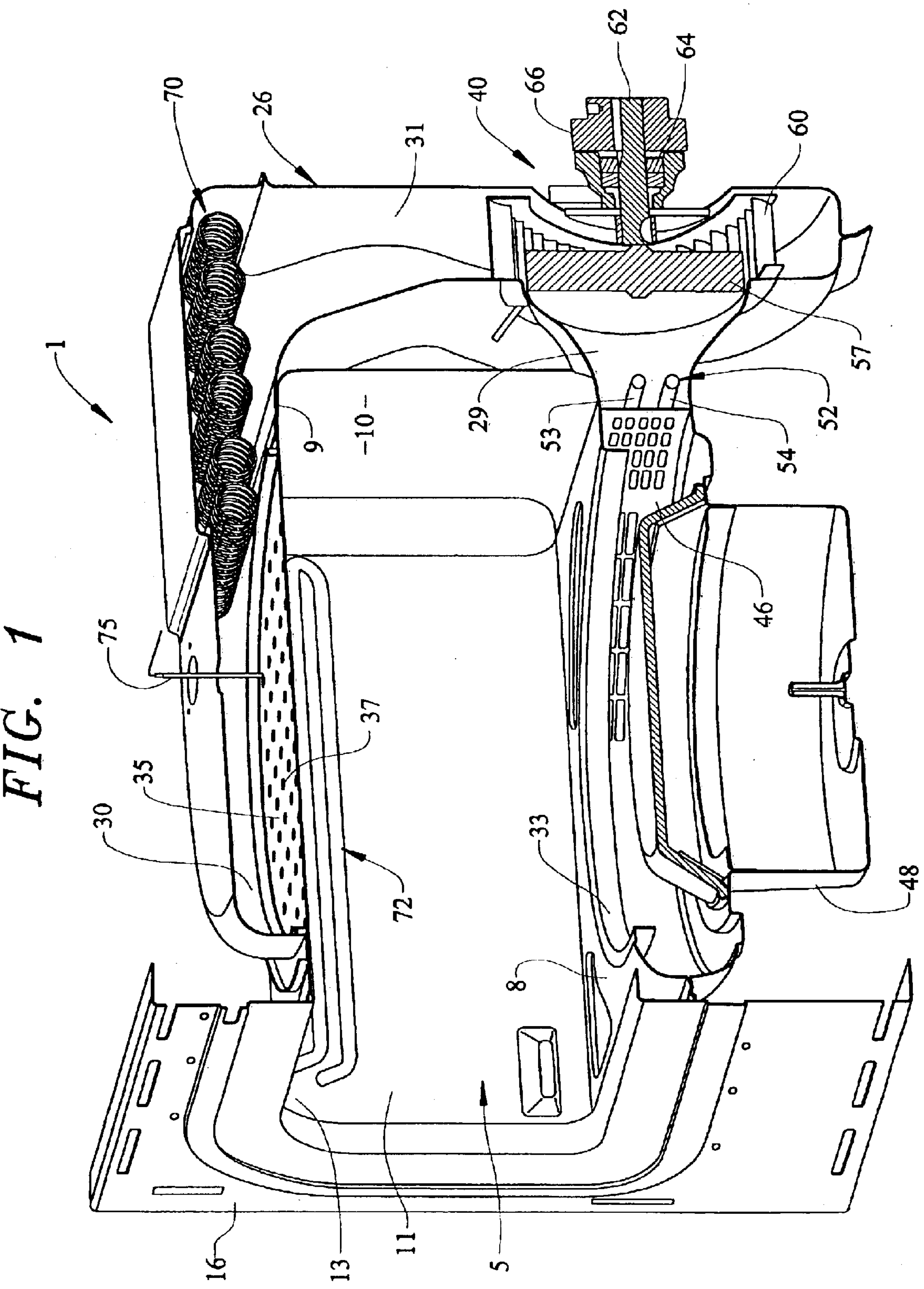
FIG. 1 is a perspective, partial sectional view of a convection cooking appliance constructed in accordance with the present invention.
Figure 2:
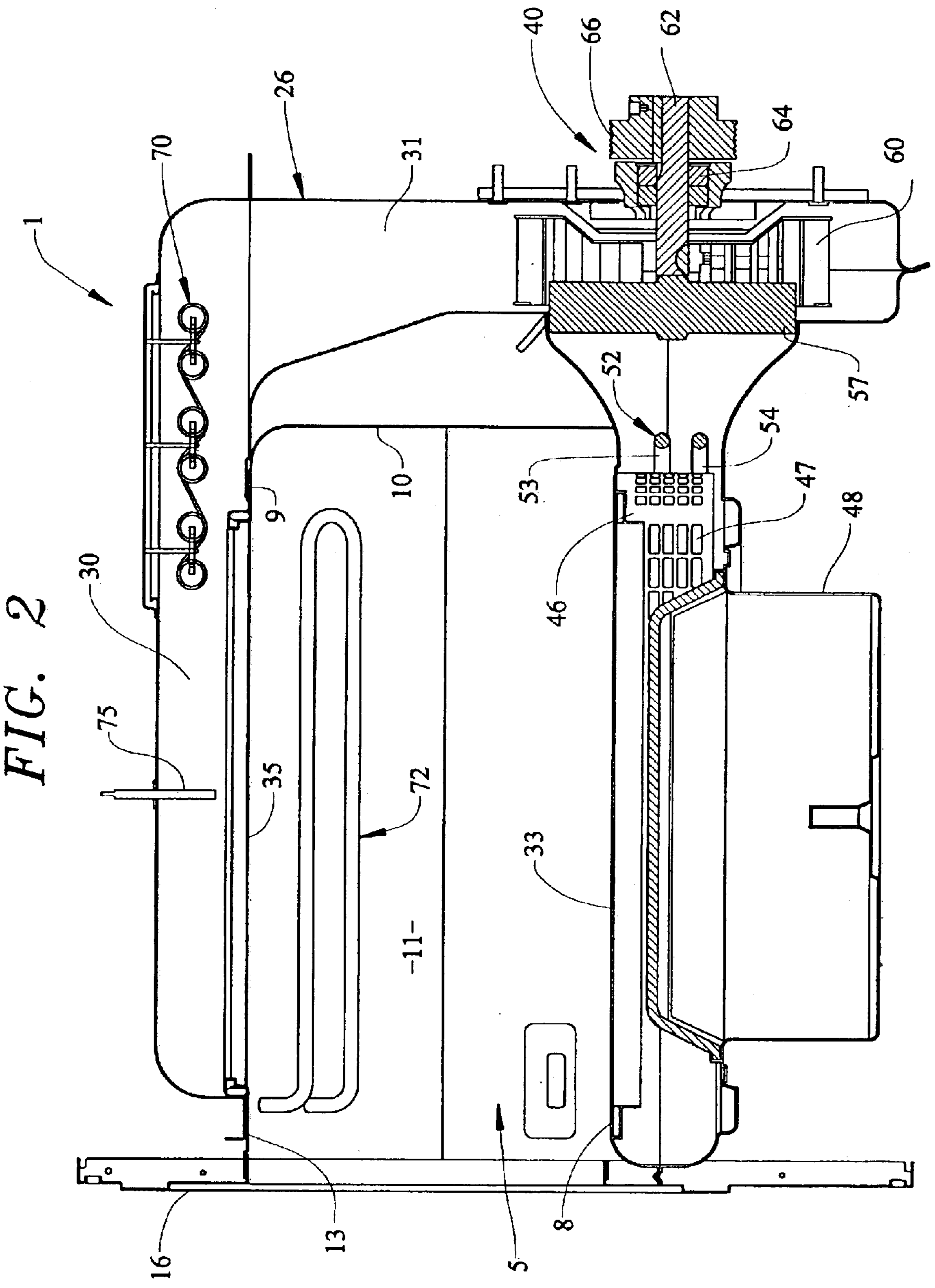
FIG. 2 is a cross-sectional side view of the cooking appliance of FIG. 1.
Figure 3:
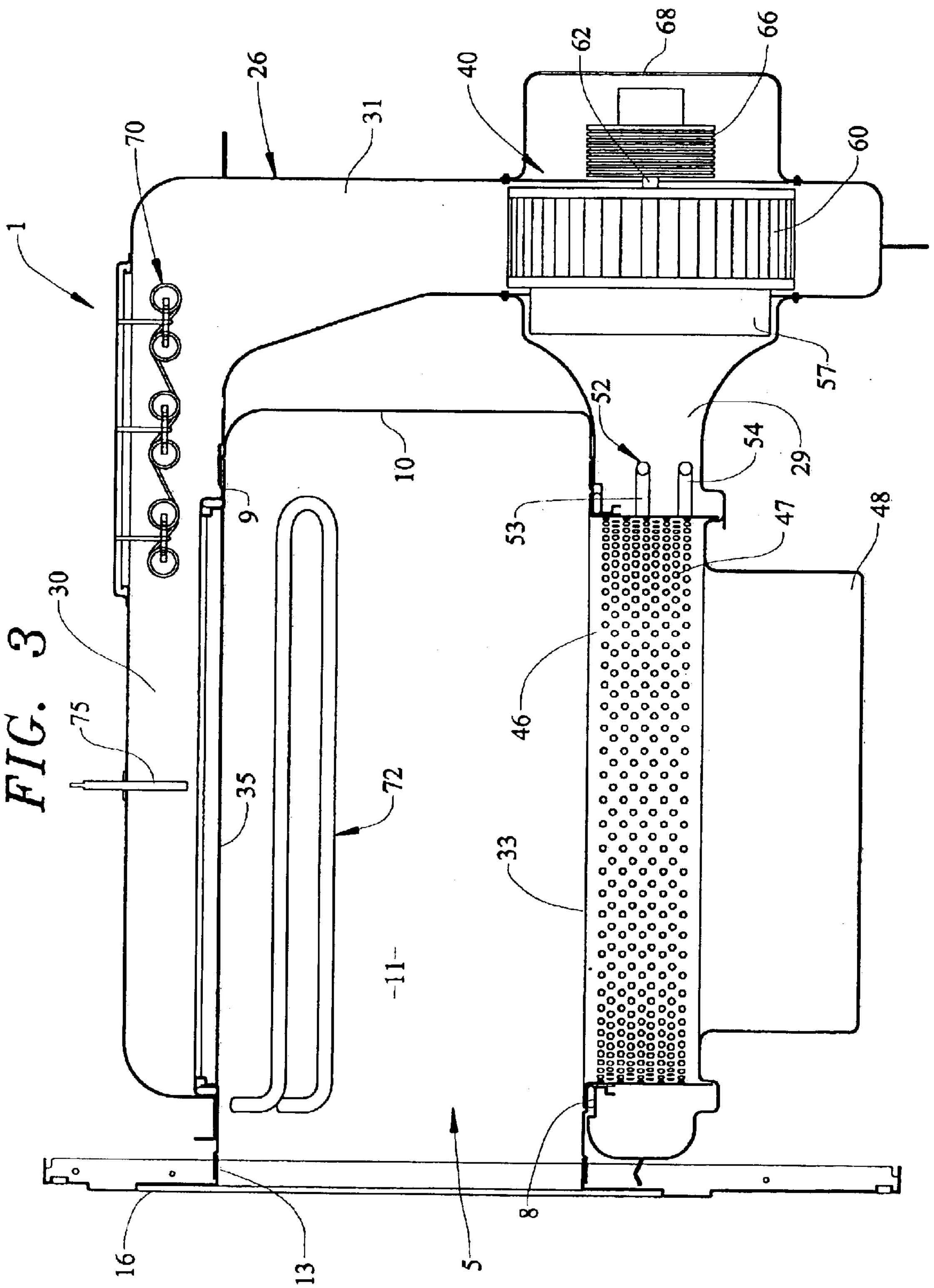
FIG. 3 is a schematic side view, similar to that of FIG. 2, of the cooking appliance.

With initial reference to FIGS. 1–3, a cooking appliance 1 is schematically shown in the form of a wall oven. Appliance 1 includes an oven cavity 5 generally defined by a bottom wall 8, a top wall 9, a rear wall 10 and a pair of side walls, one of which is indicated at 11. Oven cavity 5 also has associated therewith an access opening 13 for food items to be placed into or withdrawn from cavity 5. About access opening 13 is provided a frontal plate 16. In a manner known in the art, frontal plate 16 is adapted to be mounted against a substantially vertical wall such as in the kitchen of a residential home, and would have a door (not shown) pivotally attached thereto for selectively sealing off access opening 13.

Extending generally along top, bottom and rear portions of cavity 5 is an air channel assembly 26 defined by ducting that leads into and out of cavity 5. More specifically, air channel assembly 26 includes a lower air return section 29, an upper air delivery section 30 and a rear air transfer section 31. Lower air return section 29 is open into cavity 5 through a substantially central return air outlet 33 formed in bottom 8. In the most preferred form of the invention, return air outlet 33 is constituted by a generally circular insert provided with various spaced holes (not shown). In a similar manner, upper air delivery section 30 includes a discharge or delivery inlet 35 formed in top wall 9. Although only partially shown in FIG. 1, inlet 35 is also preferably constituted by a generally circular-shaped insert which is attached to the remainder of upper air delivery section 30 and which is provided with a plurality of holes 37.

As will become more fully evident below, the particular construction of cooking appliance 1 can significantly vary in accordance with the present invention. However, as shown, cooking appliance 1 includes an air channel assembly, such as that discussed above with reference to assembly 26, as well as a blower assembly, such as that generally indicated at 40, for use in generating a circulating flow of air through oven cavity 5. Although not considered a part of the present invention, a preferred construction for oven cavity 5 and air channel assembly 26 can be found in U.S. Pat. No. 6,373,037 entitled "OVEN CAVITY CONSTRUCTION" which is hereby incorporated by reference.

In the preferred embodiment shown, cooking appliance 1 constitutes an electric appliance and, more specifically, a combination convection, microwave and radiant cooking device. As shown in this figure, cooking appliance 1 is provided with an annular filter basket 46, having a multitude of circumferentially spaced holes 47, which is positioned within lower air return section 29 and through which the air flowing from cavity 5 through return air outlet 33 is directed. Arranged below filter basket 46 is a microwave generator unit 48 incorporating a magnetron (not specifically shown).

Encircling at least a portion of filter basket 46 is a first electric heating element 52. Heating unit 52 is shown as constituted by a sheathed electric resistance heating element having upper and lower interconnected legs 53 and 54. First electric heating unit 52 is preferably provided to heat return air flowing from oven cavity 5, through outlet 33 and filter basket 56 prior to the air reaching a catalyst indicated at 57. The present invention is particularly directed to the structure and operation of catalyst 57 as will be detailed more fully below. However, in general, catalyst 57 functions to eliminate smoke and the like from the air stream. As shown, catalyst 57 extends partially within a rotatable blower element 60 which forms part of blower assembly 40. Although blower element 60 can take various forms while performing the desired air flow generating function, blower element 60 preferably constitutes a centrifugal unit arranged at the juncture of lower air return section 29 and rear air transfer section 31. In general, blower element 60 is secured to a shaft member 62 that is rotatably mounted through a bearing assembly 64. Shaft member 62 also has attached thereto, for non-relative rotation, a sheave 66 which is adapted to receive a belt (not shown) for use in rotating blower element 60 through shaft member 62 in combination with an electric motor (also not shown). As illustrated, sheave 66 is preferably arranged within a housing extension 68 which projects from rear air transfer section 31.

Preferably mounted in upper air delivery section 30 adjacent rear transfer section 31 is a second electric heating element arrangement 70 that is preferably constituted by a bank of heating coils. Although not pertinent to the present invention, second heating unit 70 can be defined by a single open electric coil that runs back and forth across upper air delivery section 30 or multiple, separately controllable coil elements. In any event, second heating unit 70 functions to further heat the air flowing through channel assembly 26 prior to the air reaching discharge inlet 35. Also shown in this figure is a third electric heating unit 72 which, in a manner similar to first electric heating unit 52, is preferably constituted by a sheathed, resistance-type heating element. Third electric heating unit 72 preferably extends adjacent top wall 9 and constitutes an additional heat source for cavity 5 of cooking appliance 1. The particular manner in which first, second and third electric heating units 52, 70 and 72 are utilized during operation of cooking appliance 1 for a cooking mode of operation is not considered to constitute part of the present invention. Instead, these details can be found in U.S. Pat. No. 6,291,808 entitled "HEATING SYS- TEM FOR A COOKING APPLIANCE" which is incorporated herein by reference.

Figure 4:
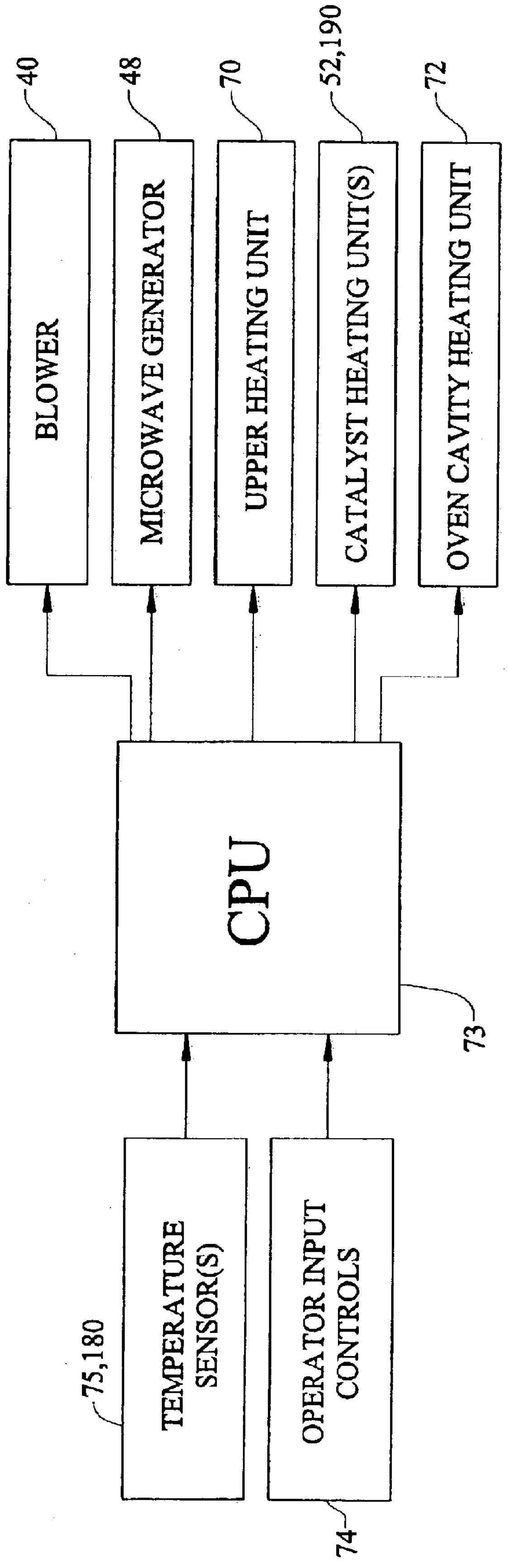
FIG. 4 is a block diagram illustrating a control arrangement used in a self-cleaning system employed in the cooking appliance of FIG. 1.

As represented in FIG. 4, each of blower assembly 40, microwave generator 48 and first, second and third electric heating units 52, 70 and 72 are linked to an appliance controller or CPU 73. Controller 73 also receives signals from operator input controls 74, as well as from a temperature sensor 75 which is preferably arranged in upper air delivery section 30, between heating unit 70 and delivery inlet 35. The present invention is particularly directed to the manner in which cooking appliance 1 is cleaned during operation and, more particularly, to the configuration and operation of catalyst 57 which will be discussed fully below after discussing the general operation of cooking appliance 1.

First of all, a user of cooking appliance 1 can select, through operator input controls 74, a convection cooking mode wherein heating element 52 is activated, along with blower assembly 40 and heating unit 70, to direct a flow of recirculating air through oven cavity 5. With this arrangement, heated air will be caused to flow within air channel assembly 26 and through holes 37 in order to impinge on food items to be cooked within oven cavity 5. During operation, blower assembly 40 can produce a certain degree of turbulence which is considered detrimental to the uniform and consistent flow of air through channel assembly 26. However, as indicated above, heating unit 70 is preferably constituted by various rows of open coils, with six rows of coils being shown in the preferred embodiment depicted in the drawings. Since the coils are open and arranged perpendicular to the flow of air, any turbulence developed by the operation of blower assembly 40 is transformed into a linear or laminar flow which enhances a smooth and continuous flow through oven cavity 5 for uniform heating.

During a convection cooking mode of operation, heating unit 70 can be cycled on and off by controller 73 in dependence on the temperature of the air as signaled by sensor 75. Within the spirit of the invention, heating unit 70 can also be variably controlled, such as by establishing low, medium or high wattage settings. For purposes of the invention, reference will be made to heating unit 70 and/or heating unit 52 being operable at varying power levels which is intended to encompass various ways in which the heating capacity of each of these units can be altered, e.g. through varying duty cycles and/or wattage settings. Although not shown, heating unit 70 is preferably, electrically linked to controller 73 through the use of a triac. Regardless of the particular operating status of heating unit 70, blower assembly 40 and heating unit 52 are operated continuously throughout the convection cooking mode in accordance with the most preferred embodiment of the invention.

The user of cooking appliance 1 can also select a microwave cooking mode wherein controller 73 activates generator 48. Again, heating unit 52 is preferably, continuously operated whenever cooking appliance 1 is operating in a cooking mode. Furthermore, in a cleaning mode, each of heating units 52, 70 and 72 are controlled for effective high temperature operation as covered by the above-referenced patent.

Upon initial activation of cooking appliance 1 for a convection cooking operation, controller 73 energizes heating unit 70, preferably at full power, and blower assembly 40 is run at a low to moderate speed. Once catalyst 57 reaches a critical temperature, e.g., 450° F., heating unit 52 is initiated under full power, i.e., a high wattage setting and/or 100% duty cycle. At this point, the greases, oils, other hydrocarbons, and the like byproducts remaining from prior cooking operations will begin combusting, thereby generating some smoke, a majority of which is forced out through catalyst 57. Because catalyst 57 has been sufficiently heated, the fats, oils and other hydrocarbons can be completely combusted and converted to carbon dioxide and water with very little or no smoke. As catalyst 57 reaches a critical firing temperature, additional combustion of the grease, oils and other hydrocarbons will commence. Therefore, in this manner, the combustion of the remaining byproducts is performed in various, controlled stages. At this point, the speed of blower assembly 40 is increased to draw additional oxygen into air channel assembly 26 in order to maintain an oxidizing atmosphere.

If a door (not shown) adapted to extend across and substantially seal oven cavity 5 is opened during preheating, blower assembly 40 remains ON in accordance with the invention, but is controlled to operate at a lower speed, preferably in the order of 20%, to create a circulation in oven cavity 5. Blower assembly 40 actually operates to create a negative pressure differential in oven cavity 5 such that any smoke will be drawn back into oven cavity 5 and through catalyst 57, instead of being released into the ambient atmosphere. In addition, the creation of the pressure differential actually functions to draw in more oxygen so as to enable even further combustion.

A main purpose of the preheat system as described above is to clean oven cavity 5 prior to cooking and between self-cleaning operations. In general, the self-cleaning sequence of the invention preferably utilizes high velocity air to heat oven cavity 5 and air channel assembly 26 to self-cleaning (pyrolitic) temperatures. In accordance with a preferred embodiment of the invention, the self-cleaning sequence includes four stages: a vent catalyst pre-heating stage; a low molecular weight hydrocarbon burn-off stage; a high temperature cleaning stage; and a cool down stage, each of which will be detailed fully below.

During the vent catalyst pre-heating stage, the door for oven cavity 5 is locked and catalyst 57 is initially heated to facilitate conversion of smoke and various hydrocarbons into carbon dioxide and water. In addition, heating elements 52 and 70 are operated at 100% power during this stage. At the same time, variable speed blower assembly 40 is operated at a low range, preferably about 20% of maximum speed, to direct a flow of heated air at catalyst 57. Heating of catalyst 57 and, correspondingly, oven cavity 5, continues until catalyst 57 reaches a predetermined temperature, preferably about 500° F.

In the next stage, catalyst 57 is fully energized as heating element 70 is activated until the temperature of the catalyst is substantially increased, preferably to about 750° F. At the same time, the speed of blower assembly 40 is increased to about 70% of the maximum air flow rate. Once catalyst 57 reaches the predetermined temperature, this temperature is maintained constant for a predetermined period of time, preferably in the order of 20 minutes.

In the third stage, the speed of blower assembly 40 is increased to about 90–100% of the maximum blower air flow rate. Heating element 52 is energized at 100% to substantially increase the temperature of catalyst 57, preferably to between 900° F. and 975° F. and, most preferably, to about 930° F. At the same time, heating element 70 and/or heating element 72 is also controlled to raise the temperature of oven cavity 5 and air channel assembly 40 to a minimum temperature above 840° F. This temperature of oven cavity 5 is maintained for a desired minimum time period, preferably at least 60 minutes. However, the actual duration of this high temperature cleaning stage can be adjusted by the operator in order to improve the overall cleaning process.

In the final stage, a cool down sequence is initiated. During this stage, all of heating elements 52, 70 and 72 are turned off, while blower assembly 40 is maintained activated, preferably at about 70% of maximum speed. After the temperature of oven cavity 5 drops below a prescribed limit, preferably set at 500° F., the oven door will unlock. At this point, the self-cleaning operation is terminated.

Figure 5:
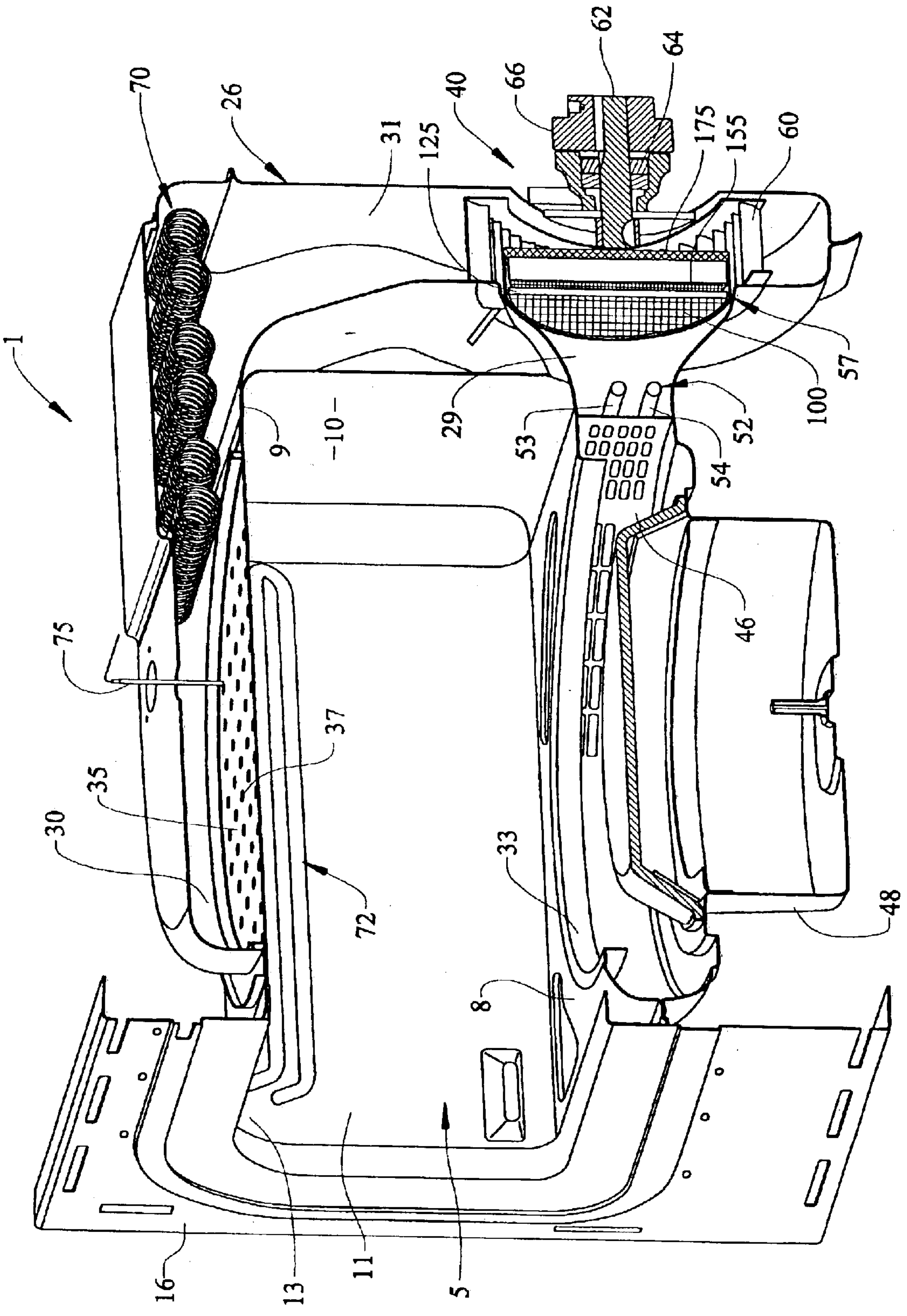
FIG. 5 is a perspective, partial cross-sectional view corresponding to that of FIG. 1, while depicting a catalyst of the cooking appliance in cross-section.

Whether in a dedicated cleaning cycle or simply operating in an overall convection cooking operation, catalyst 57 functions to heat and vaporize developed grease, oil and other byproducts produced from cooking food. Particularly, as shown best in FIG. 5, catalyst 57 defines a first stage essentially constituting a heating and vaporizing phase, a turbulence creating gap, and a second or final stage operating to break down carbon chains.

The first stage constitutes a first honeycomb structure 100 of metal and ceramic that is heated to an elevated temperature which prevents overloading of the second stage. The micro-particulate grease and oils collect in the various surfaces of first honeycomb structure 100 and are vaporized. The vaporized air is then blown off first honeycomb structure 100.

A narrow gap or opening 125 is formed between first honeycomb structure 100 and a second or final catalyst stage. Gap 125 is designed to create a turbulence of the vaporized grease and oil which causes the vapor to be impinge loaded into the final stage of catalyst 57. The final stage of the catalyst 57 preferably comprises a metallic or ceramic second honeycomb structure 150 wherein holes 155 in second honeycomb structure 150 are smaller than holes 165 in first honeycomb structure 100. More specifically, holes 155 are preferably half the opening size than holes 165. This arrangement generates a larger surface area in the final stage, i.e., at second honeycomb structure 150, of catalyst 57 as compared to the first stage defined by first honeycomb structure 100. This larger surface area is preferably in the order of eight (8) times that of first honeycomb structure 100, i.e. an approximately 8:1 surface area ratio is established. In addition, an additional increase of about 4:1 in depth is preferably employed. Therefore, an overall loaded surface area increase for second honeycomb structure 150 is increased by about thirty-two (32) times.

One or more portions of catalyst 57 can be treated with catalyst materials, such as platinum, to convert the hot vaporized greases and oils into carbon dioxide and water. Most preferably, second honeycomb structure 150 is treated in this manner to enhance the conversion of hot, vaporized greases and oils to carbon dioxide and water in an oxidizing atmosphere. As cooking appliance 1 preferably incorporates microwave generator 48, the exhaust zone (not labeled) for catalyst 57 is preferably covered with expanded metal or a perforated sheet or layer 175 to block microwave energy.

Figure 6:
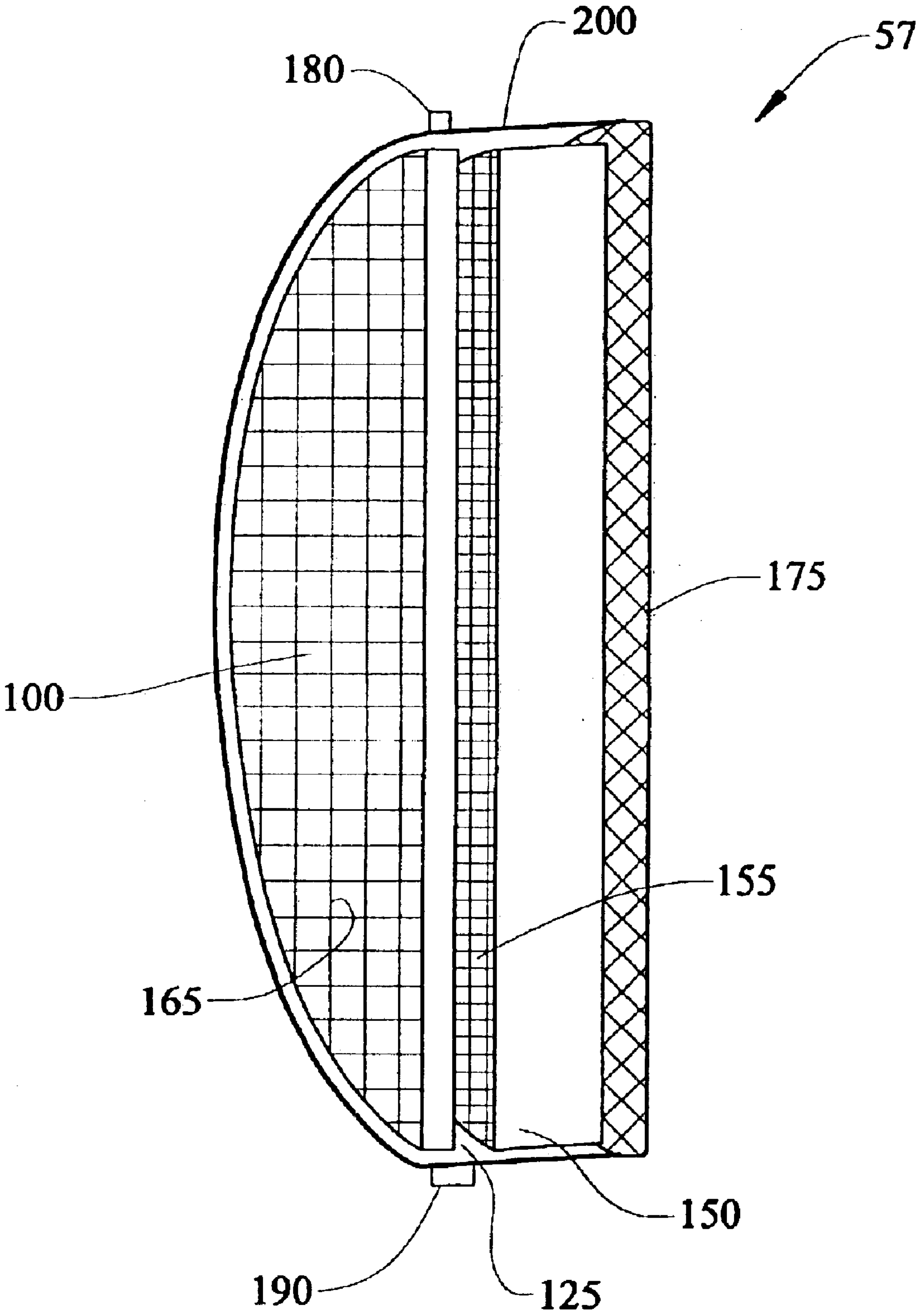
FIG. 6 is an enlarged cross-sectional view of the catalyst of FIG. 5.

With this arrangement, catalyst 57 has been found to provide enhanced operation, particularly when used in connection with a convection, microwave appliance such as cooking appliance 1. As indicated in FIG. 6, it is preferable to employ one or more control temperature sensors 180 on or directly adjacent at least first honeycomb structure 100 in order to regulate catalyst temperatures in order to ensure that the greases and oils are suitably heated. In accordance with the most preferred form of the invention, most of the thermal energy used to heat catalyst 57, i.e., 75% to 80% of the energy, is applied to first honeycomb structure 100 by heating element 52 and/or additional heating element(s) 190 on a conductor 200, preferably a relatively thick film ceramic conductors, provided directly about catalyst 57. To this end, it should be noted that sensor(s) 180 can also be screened onto the same surface as heating element 190 or even provided at heating element 52.

Although described with respect to a preferred embodiment of the invention, it should be readily understood that various changes and/or modifications can be made to the invention without departing from the spirit thereof. For instance, although the present invention has been described with reference for use in connection with cooking appliance 1 which is designed for both convection and microwave cooking, it should be readily apparent that the invention can also be applied to various types of convection cooking appliances, including ranges and other wall oven arrangements not including a microwave source. Particularly, although catalyst 57 is considered to be particularly advantageous when used in combination with convection and microwave cooking appliance 1, catalyst 57 can be employed in other environments as well. In any event, the invention is only intended to be limited by the scope of the following claims.

We claim:

1. A convection cooking appliance comprising:

an oven cavity;

an air channel assembly extending about at least a portion of and being in fluid communication with the oven cavity;

a blower element for developing a flow of air within the air channel assembly and through the oven cavity;

at least one heating unit for heating the flow of air; and a catalyst positioned within the air channel assembly and adapted to receive a flow of cooking byproducts developed during cooking of food products in the oven cavity, said catalyst including a first stage defined by a first honeycomb structure having a first plurality of openings, a second stage defined by a second honeycomb structure having a second plurality of openings which are multiple times smaller than the first plurality of openings, and a gap separating said first and second honeycomb structures, wherein the first honeycomb structure is arranged to initially vaporize the cooking byproducts which are then distributed to the second honeycomb structure where the vaporized cooking byproducts are broken down into carbon dioxide and water prior to being expelled from the catalyst.

2. The cooking appliance according to claim 1, wherein at least one of the first and second honeycomb structures is formed from a material selected from the group consisting of metal and ceramic.

3. The cooking appliance according to claim 2, wherein both of the first and second honeycomb structures are formed of the same material.

4. The cooking appliance according to claim 1, wherein the second plurality of openings are sized approximately one-half the first plurality of openings.

5. The cooking appliance according to claim 4, wherein the second plurality of openings collectively define a contact surface area which is approximately eight times a contact surface area collectively defined by the first plurality of openings.

6. The cooking appliance according to claim 1, wherein the second plurality of openings are multiple times deeper than the first plurality of openings.

7. The cooking appliance according to claim 1, further comprising: means for generating heat for heating the catalyst, wherein at least 75% of the heat is applied to the first honeycomb structure.

8. The cooking appliance according to claim 1, further comprising: a control temperature sensor attached to the catalyst for use in regulating a temperature of at least the first honeycomb structure.

9. The cooking appliance according to claim 8, further comprising: an additional heating unit attached to the catalyst for heating at least the first honeycomb structure.

10. The cooking appliance according to claim 1, further comprising:

a microwave generator for introducing microwaves into the oven cavity.

11. A catalyst for breaking down cooking byproducts developed during operation of a cooking appliance comprising:

a first stage defined by a first honeycomb structure having a first plurality of openings;

a second stage defined by a second honeycomb structure having a second plurality of openings which are multiple times smaller than the first plurality of openings; and a gap separating said first and second honeycomb structures, wherein the first honeycomb structure is arranged to initially vaporize cooking byproducts which are then distributed to the second honeycomb structure where the vaporized cooking byproducts are broken down into carbon dioxide and water prior to being expelled from the catalyst.

12. The catalyst according to claim 11, wherein at least one of the first and second honeycomb structures is formed from a material selected from the group consisting of metal and ceramic.

13. The catalyst according to claim 12, wherein both of the first and second honeycomb structures are formed of the same material.

14. The catalyst according to claim 11, wherein the second plurality of openings are sized approximately one-half the first plurality of openings.

15. The catalyst according to claim 14, wherein the second plurality of openings collectively define a contact surface area which is approximately eight times a contact surface area collectively defined by the first plurality of openings.

16. The catalyst according to claim 11, wherein the second plurality of openings are multiple times deeper than the first plurality of openings.

17. The catalyst according to claim 11, further comprising: means for generating heat for heating the first and second honeycomb structures, wherein at least 75% of the heat is applied to the first honeycomb structure.

18. The catalyst according to claim 11, further comprising: a temperature sensor for use in regulating a temperature of at least the first honeycomb structure.

19. The catalyst according to claim 18, further comprising: a heating unit for heating at least the first honeycomb structure.

20. A method of performing a self-cleaning operation in a convection cooking appliance including an oven cavity, at least one heating element, and a blower for generating an airflow inside an air channel assembly leading to and from the oven cavity comprising:

directing cooking byproducts from the oven cavity to a catalyst positioned in the air channel assembly;

collecting the cooking byproducts in openings defined in a surface of a first stage of the catalyst;

vaporizing the cooking byproducts by heating the cooking byproducts in the first stage;

directing the vaporized cooking byproducts to a gap defining a second stage provided between the first stage and a third stage of the catalyst;

converting the cooking byproducts to carbon dioxide and water at the third stage; and exhausting the carbon dioxide and water from the catalyst.

21. The method of claim 20, further comprising: creating a turbulence in the gap for delivery of the vaporized cooking byproducts to the third stage.

22. The method of claim 20, wherein heating of the cooking byproducts is performed by heating the catalyst, with approximately 75% of the heat is applied to the first stage of the catalyst.

23. The method of claim 22, wherein the cooking byproducts are collected in a first honeycomb structure which defines the first stage of the catalyst.

24. The method of claim 23, wherein the cooking byproducts are converted to carbon dioxide and water in a second honeycomb structure which defines the third stage of the catalyst.

25. The method of claim 24, further comprising: allowing the carbon dioxide and water to exit the second honeycomb structure through openings which are approximately half a size of openings of the first honeycomb structure.

26. The method of claim 20, further comprising:

sensing a temperature of the catalyst; and regulating the temperature of at least the first stage based on the temperature of the catalyst.

27. The method of claim 26, further comprising: activating an additional heater attached to the catalyst for heating at least the first stage.

* * * * *